Oct. 23, 1928.                                               1,689,112
                            A. CAIN
                            FLY SHOO
                        Filed Nov. 8, 1927
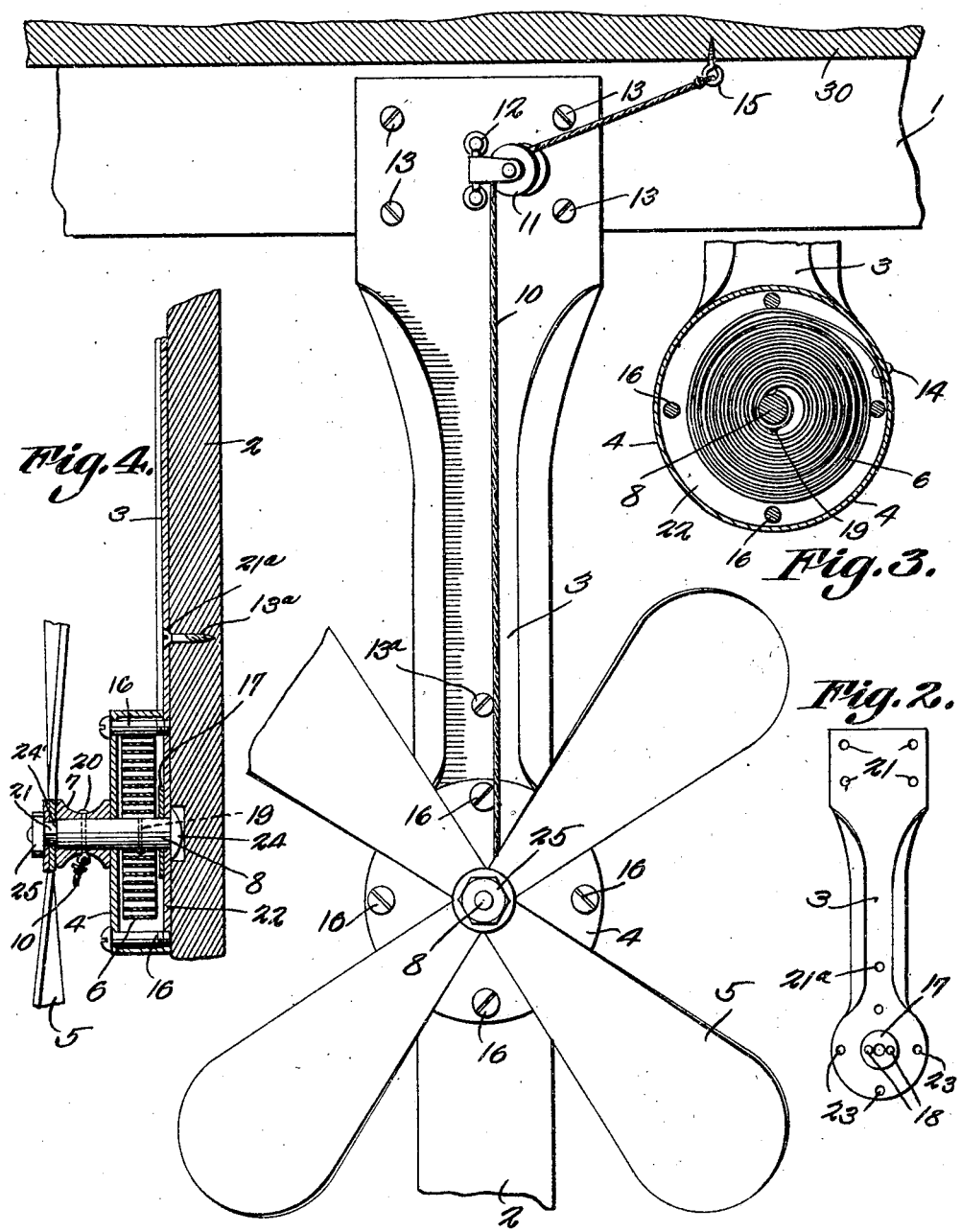
Art Cain
Inventor Patented Oct. 23, 1928.

1,689,112

UNITED STATES PATENT OFFICE.

ART CAIN, OF INDIANOLA, NEBRASKA.

FLY SHOO.

Application filed November 8, 1927. Serial No. 231,825.

The device forming the subject matter of this application is a fly shoo, meaning thereby a device embodying a fan and adapted to be fastened to the top and center of a screen door and to be operated by a coiled spring and a cord, one end of the cord being secured to the center of the header or lintel of the door frame, the construction being such that, when the screen door is opened, the fan will be caused to rotate at such a speed that flies will be blown away and prevented from entering into a building through the doorway.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in elevation, a portion of a door and a door frame wherewith the device forming the subject matter of this application has been assembled;

Figure 2 is an elevation of the bracket which carries the fan;

Figure 3 is a sectional view showing the spring housing and attendant parts; and Figure 4 is a longitudinal section taken through the bracket and through a part of the door.

The numeral 30 marks the lintel of a door frame, with which cooperates a screen door, including an upper cross bar 1 and a division piece 2 extended downwardly from the cross bar, the construction alluded to being common and well known.

In carrying out the invention, there is provided an elongated bracket 3, preferably made of metal, and shown in outline in Figure 2 of the drawings. The bracket 3 is placed lengthwise of the division piece 2, and the upper end of the bracket overlaps the cross bar 1 of the screen door. There are openings 21 in the upper end of the bracket 3, and securing elements 13 pass through the openings 21 and attach the upper end of the bracket to the cross bar 1.

The bracket 3 is provided near to its lower end with an opening 21ª adapted to receive a securing element 13ª whereby the bracket is connected to the division piece 2. The lower end of the bracket 3 is marked by the numeral 22 and is of enlarged, circular disk like form. There are openings 23 in the end member 22 of the bracket 3.

A cup shaped housing 4 is attached to the end member 22 of the bracket 3 by securing elements 16 mounted in the openings 23. A bearing 17, in the form of a washer is held by securing device 18 on the end member 22 of the bracket 3, within the housing 4. A shaft 8 is journaled for rotation in the bearing 17 and in the bracket 3, the shaft having a head 24 engaged behind the bracket 3. The shaft 8 extends outwardly through the forward wall of the housing 4.

A nut 25 is threaded on the outer end of the shaft 8, and to the rear of the nut 25, the shaft 8 has a squared part 21 which forms a shoulder 24'. A fan 5 is mounted on the squared part 21 of the shaft 8 and is held thereon against rotation independently of the shaft. The hub of the fan 5 is bound against the shoulder 24' by the nut 25. A spool is mounted on the shaft 8 between the hub of the fan 5 and the outer wall of the housing 4. A securing device, such as a pin 20, passes through the spool 7 and through the shaft 8 and holds the spool on the shaft. The securing device or pin 20 not only fastens the spool 7 to the shaft 8, but also holds one end of a flexible element or cord 10 which is wound about the spool 7.

The upper end of the flexible element 10 is anchored by means of a screw eye 15 on the lintel 30. The intermediate portion of the flexible element 10 is guided by a pulley 11 held by fastening means 12 on the upper end of the bracket 3. Because the fastening means is located on the bracket, within the rectangle defined by the securing elements 13, a very secure anchorage for the pulley 11 is afforded. A coiled torsion spring 6 is located in the housing 4 about the shaft 8. The inner end of the spring 6 is attached by a fastening device 19 to the shaft 8 and the outer end of the spring is attached by a fastening device 14 to the housing 4.

When the door is opened, the flexible element 10 is reeled off the spool 7 and rotation is imparted in one direction to the shaft 8 and to the fan 5, the spring 6 being put under torsion. When the door is closed, the spring 6 reacts and rotates the shaft 8 and the fan 5 in an opposite direction, the flexible element 10 being reeled up on the spool 7. The fan, thus, is spun at a speed great enough to blow flies away, and the aforesaid insects will not fly over the screen door into the building.

What is claimed is:—

1. In a device of the class described, a substantially vertical bracket, means for securing the upper end of the bracket to a door, a shaft journaled on the lower end of the bracket, a fan on the outer end of the shaft, a housing mounted on the lower end of the bracket, the shaft passing through the housing, a torsion spring in the housing, means for securing the inner end of the spring to the shaft, means for anchoring the outer end of the spring, a flexible element wound about the shaft and secured at one end to the shaft and located between the fan and the housing, means for holding the opposite end of the flexible element, and a direction-changing guide engaged by the flexible element and mounted on the upper end of the bracket.

2. In a device of the class described, a bracket, means for mounting the bracket on a door, a shaft mounted to rotate in the bracket, a torsion spring, means for connecting the inner end of the spring to the shaft, means for anchoring the outer end of the spring, a fan secured to the shaft, a sopol on the shaft, a securing device connecting the spool with the shaft, a flexible element mounted at one end on the securing device and adapted to be wound about the spool, means for holding the opposite end of the flexible element, and means for guiding the intermediate portion of the flexible element.

ART CAIN.